July 4, 1961

A. M. HEUNINCKX ET AL 2,991,323

INTER-CELL CONNECTION AND SEALING OF
SECONDARY BATTERIES IN SERIES

Filed Nov. 19, 1958

INVENTORS
ALPHONSE M. HEUNINCKX, DECEASED
BY THAYER A. HARVEY
ADMINISTRATOR

JAMES SOUTHWORTH, JR.

BY *John F. Hohmann*
ATTORNEY

United States Patent Office 2,991,323
Patented July 4, 1961

2,991,323
INTER-CELL CONNECTION AND SEALING OF SECONDARY BATTERIES IN SERIES
Alphonse M. Heuninckx, deceased, late of Lancaster, N.Y., by Thayer A. Harvey, administrator, Minneapolis, Minn.; and James Southworth, Jr., Rocky River, Ohio, assignors to Union Carbide Corporation, a corporation of New York
Filed Nov. 19, 1958, Ser. No. 775,066
3 Claims. (Cl. 136—6)

This invention relates to a method of connecting cells in series to form a battery, and, more particularly, it relates to a method of providing series-assembled batteries having all of the elements of all of the cells in one container.

The usual method of making a series cell assembly is to manufacture the cells in individual containers and then connect them by soldering or welding electrical connectors between the individual unit cells, or by placing the individual unit cells in a stacked arrangement with their terminals properly aligned and maintaining low resistance electrical contact between the terminal surfaces of the individual containers by applying pressure to the stack.

When either of the above methods is used for manufacturing a series cell assembly, external means must be used to effectuate the electrical interconnection, such as soldering or welding equipment in conjunction with electrical connectors, or in the case of a stack of unit cells, pressure applying means, such as a tying band or a resilient metal plate interposed between the cell stacks and an enclosing container.

It is readily apparent that the necessity of employing external means to effectuate low resistance electrical interconnection in the normal assembly procedure is disadvantageous for both ease of assembling and economical reasons.

The principal object of the invention is to provide a simple method of making series assembled batteries characterized by having all of the elements of all of the cells in one container.

A concurrent object of the invention is to provide a series asembled battery characterized by ease of assembly and reduced cost.

Broadly stated, the invention comprises drawing a metallic container, having an electrolyte impervious hard plastic or nylon sleeve liner and containing a desired number of unit cells and strong metallic inter-cell electrical connectors properly positioned therein, through a draw die to reduce its diameter. This reduction of the diameter of the container prevents electrolyte leakage between the unit cells and from the battery as a whole and at the same time causes a permanent pressure to be applied on the unit cells for the purpose of reducing impedence values.

The invention may be more readily understood by reference to the accompanying drawings which illustrate one embodiment of the principles of the invention and wherein.

Figure 1:
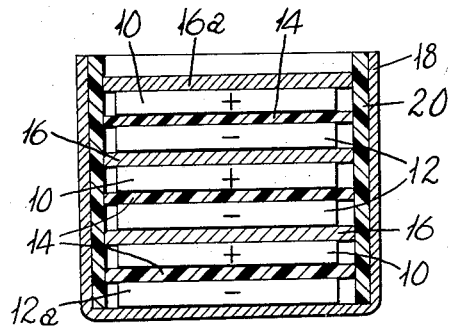
FIG. 1 is a vertical section of a nickel-cadmium rechargeable battery, containing three individual unit cells, showing in proper position the various parts of the battery prior to the drawing process.
Figure 2:
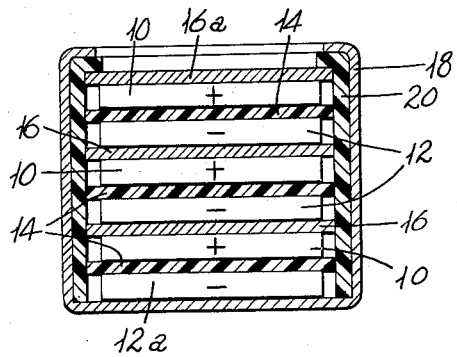
FIG. 2 shows the battery of FIG. 1 after the top of the container and the plastic sleeve liner have been crimped over the top inter-cell connector.
Figure 3:
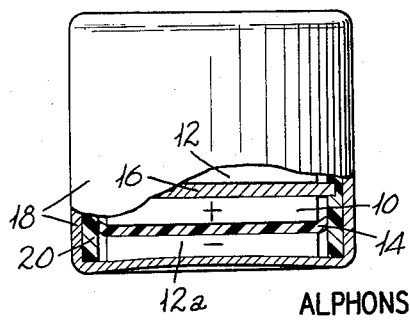
FIG. 3 shows the battery of FIG. 2 after it has been drawn through a draw die.

Referring now to FIGS. 1 to 3, the method of the invention comprises inserting within a cylindrical metallic container 18, the inner wall of which is lined with an electrolyte impervious plastic sleeve liner 20, preferably of hard nylon, a sufficient number of unit cells to give the desired battery voltage. Each unit cell comprises a positive nickel electrode 10 and a negative cadmium electrode 12 which are separated by a separator 14, suitably of a porous nylon paper or of a copolymer of vinyl chloride and vinyl acetate. As shown in the drawings each unit cell is separated from the adjacent unit cell by a rigid disc-shaped metallic inter-cell connector 16. Sufficient electrolyte is incorporated in the system by saturating the electrodes 10 and 12 and the separator 14 with electrolyte before they are placed in the stacked assembly. The bottom electrode 12a of the stack of cells is placed in direct contact with the bottom of the one piece drawn metal outer container 18 which serves as one of the terminals of the battery. One of the rigid metal connector discs 16a is placed at the top of the stack and serves as both the closure member for the top cell and as the other battery terminal member. The other rigid metal discs 16 serve as partitions which isolate the electrolyte saturated electrode 10 or 12 of one unit cell from the electrolyte saturated electrode 10 or 12 of the adjacent unit cell as well as serving to provide electrical inter-cell connection.

As shown in FIG. 1, the nylon sleeve liner 20 extends from the bottom to the top of the one piece container 18 and both the container 18 and the sleeve 20 extend above the top inter-cell connector 16a which resides on the top of the stack of cells. This sleeve 20 is of the same outside diameter as the inside diameter of the container 18 and has an inside diameter slightly larger than the diameter of intercell connector discs 16.

As shown in FIG. 2, after the individual unit cells and the connector discs 16 are inserted, the top edge of the lined container 18 is crimped over to hold the cell elements in close contact with the connector discs 16 and then the container 18 is drawn to a reduced diameter by pushing it through a draw die. The force required for pushing the container 18 through the die may be applied by a flat faced ram applied to the bottom of the container 18.

FIG. 3 illustrates the battery after its diameter has been reduced by the drawing process. This drawing of the container 18 in addition to reducing the diameter of the container 18 and thus providing a tight seal between the nylon sleeve liner 20 and the individual connector discs 16 by radial compression of the nylon sleeve liner 20 to prevent electrolyte leakage between the individual cells and from the battery as a unit, also causes a slight concavity on the underside of the container 18. This slight distortion coupled with resilient compressibility of the porous insulating cell separators 14 serves to maintain a contact pressure between cells even after the length of the container 18 of the battery is increased as the result of the drawing.

While the above discussion is directed specifically toward nickel-cadmium secondary cells it is obvious that the principles of the invention may also be applied to the manufacture of primary cell series connected batteries, such as magnesium-manganese dioxide primary cells as well as to other secondary cell series connected batteries, such as lead acid storage batteries. In such constructions the same method as outlined above is followed using of course proper individual cell components and inter-cell connector discs made of a suitable material which will not be deleteriously affected by the electrolyte employed. For example, in a lead acid storage battery embodying the principles of the invention the metal connector disc may be made of stainless steel.

What is claimed is:
1. A radially sealed battery comprising a metallic cylindrical container having an electrolyte impervious hard plastic sleeve liner and having contained therein a plurality of cells; each of said cells comprising a positive electrode and a negative electrode with a separator therebetween and electrolyte throughout; said cells being arranged in a stack formation with adjacent cells electrolytically isolated from one another by a unitary metallic disc which is embedded in said electrolyte impervious sleeve liner, said metallic discs also serving to electrically inter-connect said adjacent cells in a series relation by being in direct contact with an electrode of each of the adjacent cell units which it separates; said metallic discs being in addition to the current generating components of said cells and being substantially inert to attack by said electrolyte.

2. A radially sealed battery comprising a metallic cylindrical container having an electrolyte impervious hard plastic sleeve liner and having contained therein a plurality of cells; each of said cells comprising a positive electrode and a negative electrode with a separator therebetween and electrolyte throughout; said cells being arranged in a stacked formation; the bottom cell having one of its electrodes in direct contact with the bottom of said metallic cylindrical container which thereby acts as one terminal of said battery; the adjacent cells in said stack being electrolytically isolated from one another by a metallic disc which is embedded in said electrolyte impervious sleeve liner, said metallic disc also serving to electrically inter-connect said adjacent cells in a series relation by being in direct contact with an electrode of each of the adjacent cell units which it separates; said metallic discs being in addition to the current generating components of said cells and being substantially inert to attack by said electrolyte; said stack of cells having residing at its top one of said metallic discs which acts as the sealing member of said sealed battery and as the other terminal of said sealed battery; the bottom of said container having a concavity therein thus causing it to bear against the bottom member of said stack to place and maintain said stack in compression.

3. A radially sealed battery comprising a metallic cylindrical container, said container being of a metal chosen from the group consisting of nickel and nickel plated steel, said container having an electrolyte impervious hard nylon plastic sleeve liner and having contained therein a plurality of cells; each of said individual cells comprising a positive sintered nickel electrode and a negative sintered cadmium electrode with a separator therebetween, said separator being chosen from the group consisting of porous nylon paper and a copolymer of vinyl chloride and vinyl acetate, and electrolyte throughout; said cells being arranged in a stacked formation; the bottom cell having one of its electrodes in direct contact with the bottom of said cylindrical container which thereby acts as one terminal of said battery; said stacked cells being electrolytically isolated from one another by hard nickel discs which are embedded in said electrolyte impervious sleeve liner, said metallic discs also serving to electrically inter-connect said cells in a series relation; said stack of cells having residing at its top, one of said hard nickel discs which acts as the sealing member of said sealed battery and as the other terminal of said battery; the bottom of said container having a concavity therein thus causing it to bear against the bottom member of said stack to place and maintain said stack in compression.

References Cited in the file of this patent

UNITED STATES PATENTS

| | | |
|---|---|---|
| 418,700 | Dey | Jan. 7, 1890 |
| 2,499,239 | Williams | Feb. 28, 1950 |
| 2,620,369 | Daniel | Dec. 2, 1952 |
| 2,646,455 | Jeannin | July 21, 1953 |
| 2,649,492 | Linton et al. | Aug. 18, 1953 |
| 2,707,199 | Ruben | Apr. 26, 1955 |
| 2,833,848 | Marty | May 6, 1958 |
| 2,865,976 | Jammet | Dec. 23, 1958 |